US008850067B2

(12) United States Patent
Ait-Ameur et al.

(10) Patent No.: US 8,850,067 B2
(45) Date of Patent: Sep. 30, 2014

(54) INTERNET PROTOCOL (IP) ADDRESS POOL MANAGEMENT AND ALLOCATION

(75) Inventors: Samir Ait-Ameur, Fremont, CA (US); Imtiyaz Shaikh, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 827 days.

(21) Appl. No.: 12/603,616

(22) Filed: Oct. 22, 2009

(65) Prior Publication Data

US 2011/0099293 A1 Apr. 28, 2011

(51) Int. Cl.
*G06F 15/16* (2006.01)
*G06F 15/173* (2006.01)
*H04L 29/06* (2006.01)
*H04W 12/06* (2009.01)
*H04L 29/12* (2006.01)

(52) U.S. Cl.
CPC ...... *H04L 29/12245* (2013.01); *H04L 63/0892* (2013.01); *H04W 12/06* (2013.01); *H04L 61/2061* (2013.01); *H04L 29/12283* (2013.01); *H04L 61/203* (2013.01)
USPC .......................................... 709/245; 709/224

(58) Field of Classification Search
None
See application file for complete search history.

(56) References Cited

U.S. PATENT DOCUMENTS

| 7,376,100 | B2* | 5/2008 | Chang | 370/329 |
| 7,990,891 | B2* | 8/2011 | Lu et al. | 370/254 |
| 8,316,113 | B2* | 11/2012 | Linden et al. | 709/220 |
| 8,321,567 | B1* | 11/2012 | Sheth | 709/226 |
| 2004/0066760 | A1* | 4/2004 | Thubert et al. | 370/329 |
| 2005/0235000 | A1* | 10/2005 | Keil | 707/200 |
| 2006/0198349 | A1* | 9/2006 | Ng et al. | 370/338 |
| 2009/0089410 | A1* | 4/2009 | Vicente | 709/223 |
| 2009/0285196 | A1* | 11/2009 | Lee et al. | 370/345 |
| 2009/0316625 | A1* | 12/2009 | Chen et al. | 370/328 |
| 2010/0046363 | A1* | 2/2010 | Shenoy et al. | 370/216 |
| 2010/0046426 | A1* | 2/2010 | Shenoy et al. | 370/328 |
| 2010/0169446 | A1* | 7/2010 | Linden et al. | 709/206 |

\* cited by examiner

*Primary Examiner* — Ninos Donabed
*Assistant Examiner* — Thomas Richardson

(57) ABSTRACT

A device receives Internet protocol (IP) traffic flow data from network devices of a wireless network, groups the network devices into sets based on the IP traffic flow data, and estimates, based on the sets, information associated with the network devices. The device also groups the network devices into clusters based on the estimated information, ranks the clusters, and assigns IP address pools to each of the network devices based on the ranked clusters. The device further provides the assigned IP address pools to authorization, authentication, accounting (AAA) devices of the wireless network.

24 Claims, 11 Drawing Sheets

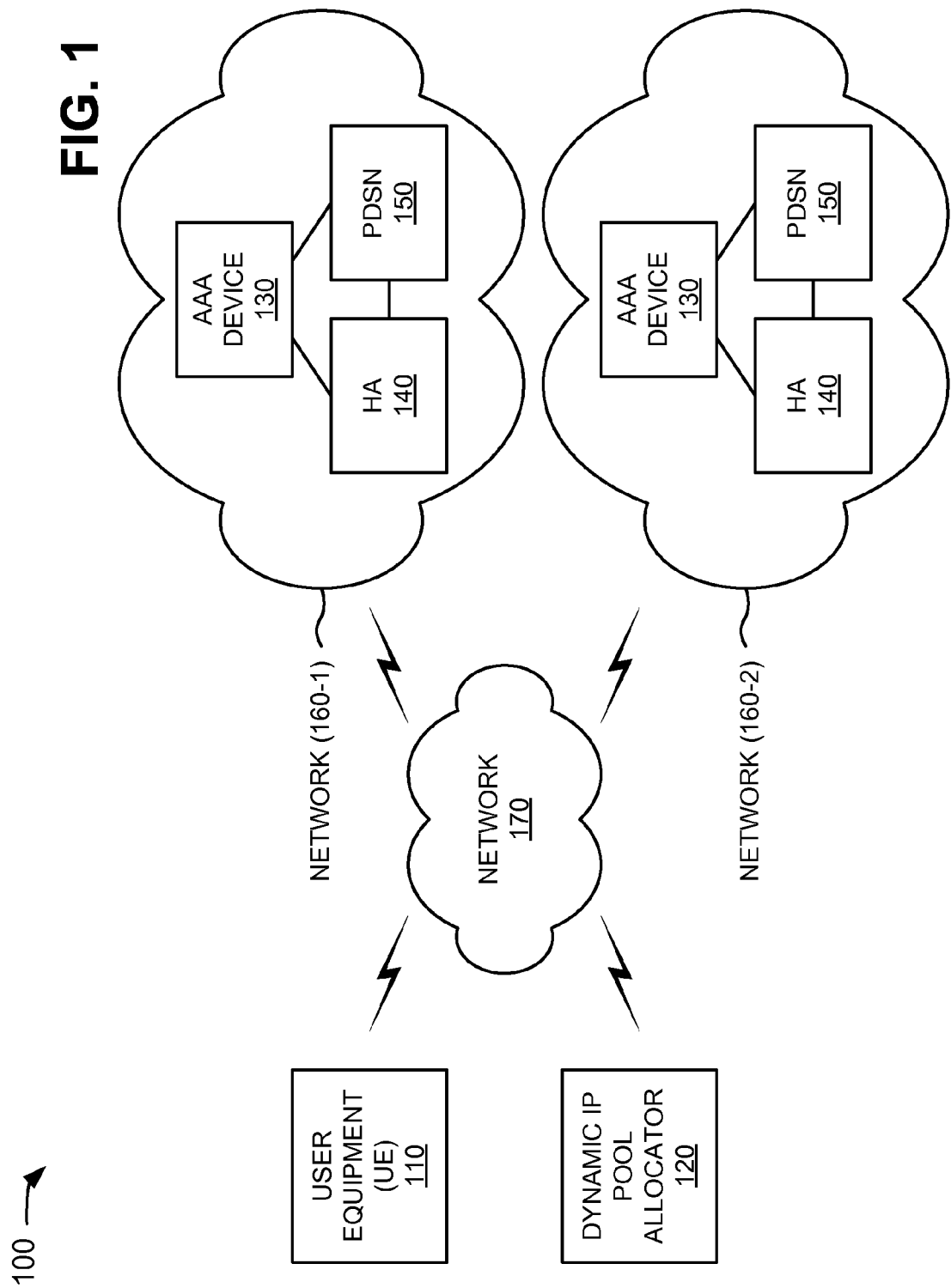

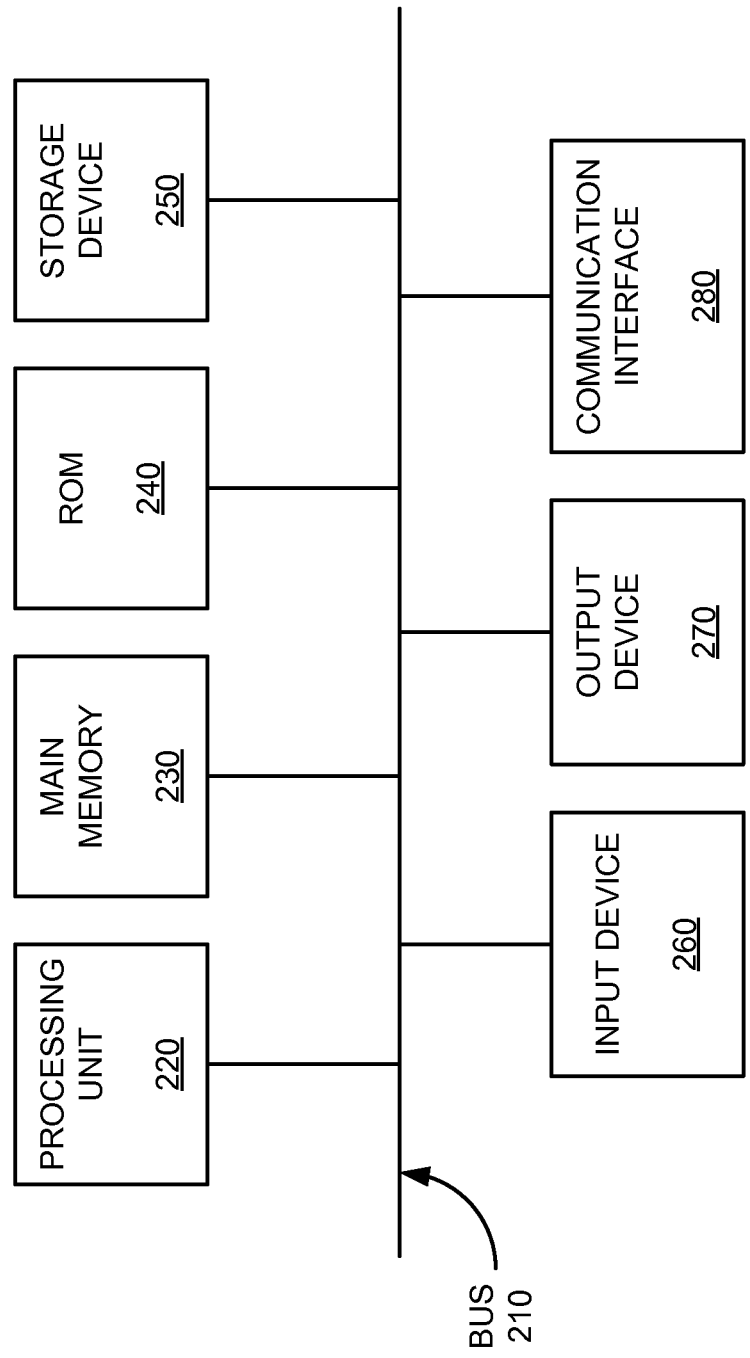

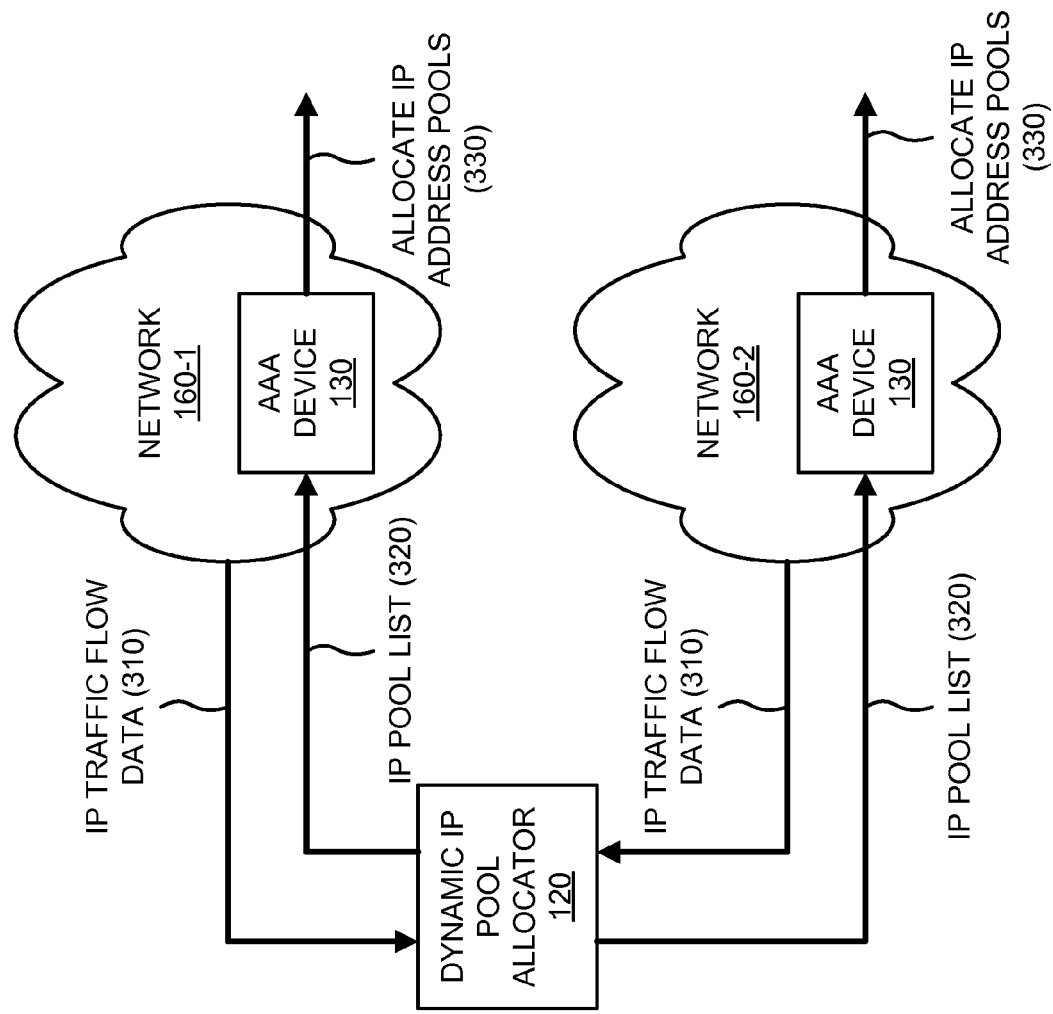

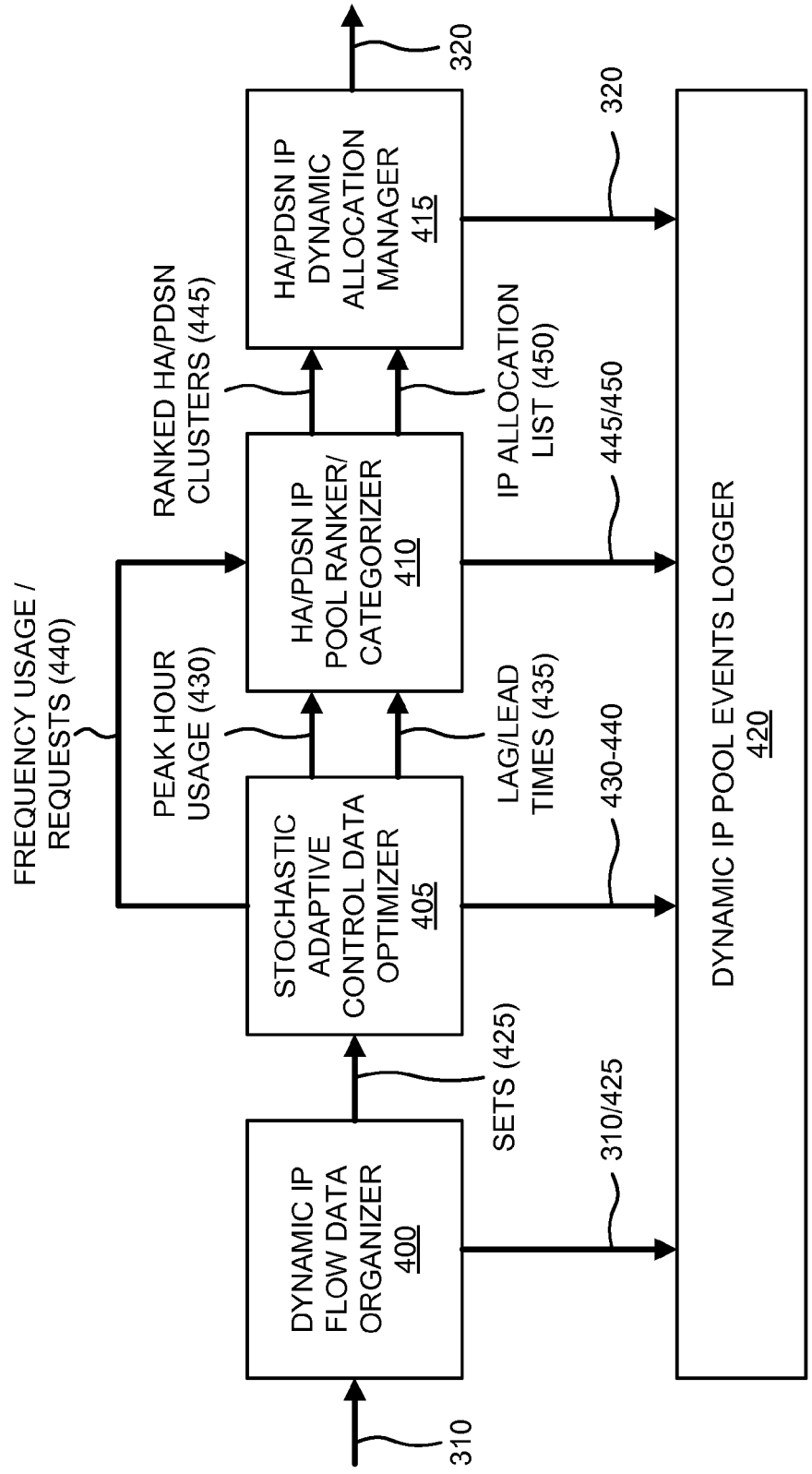

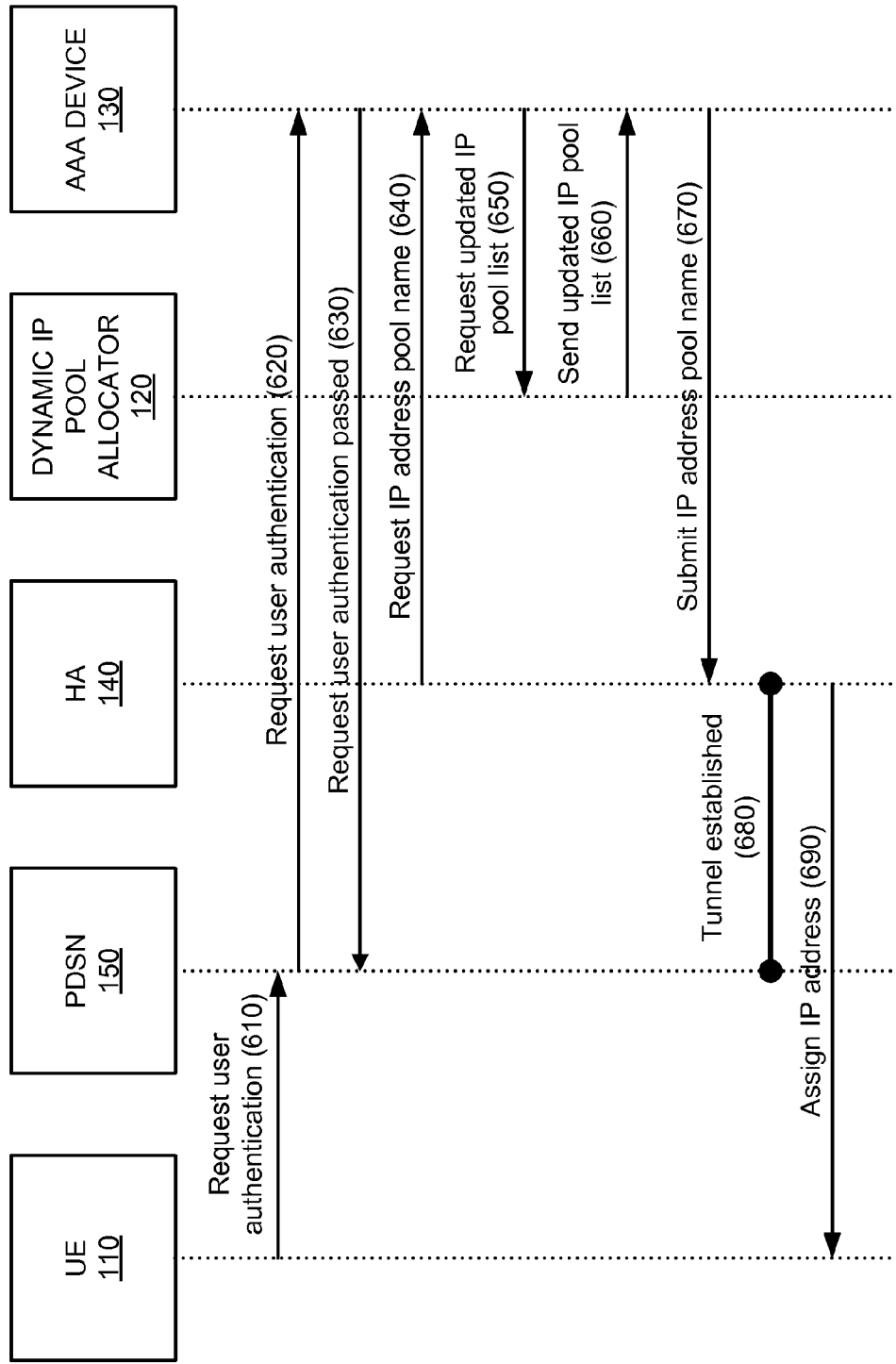

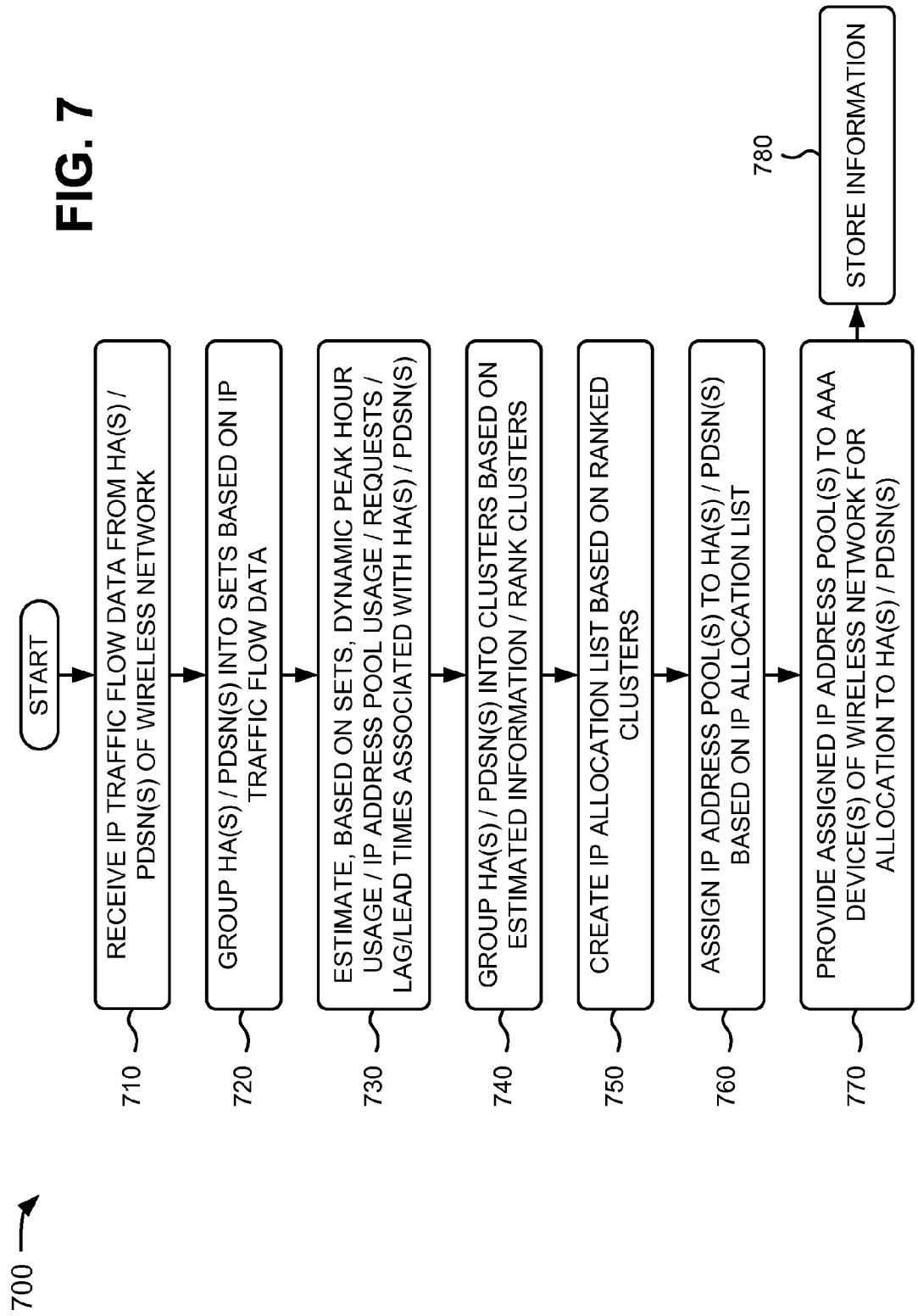

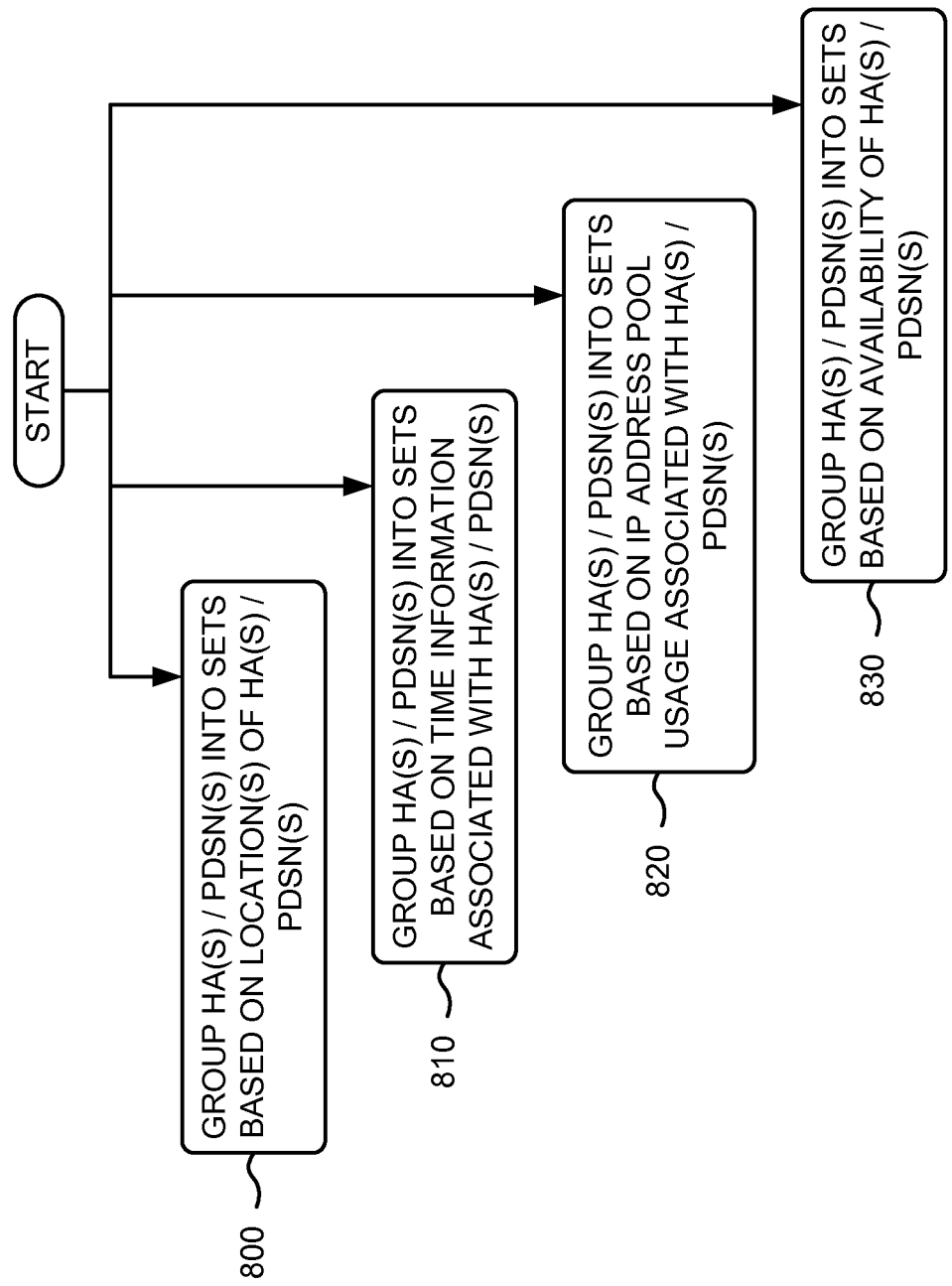

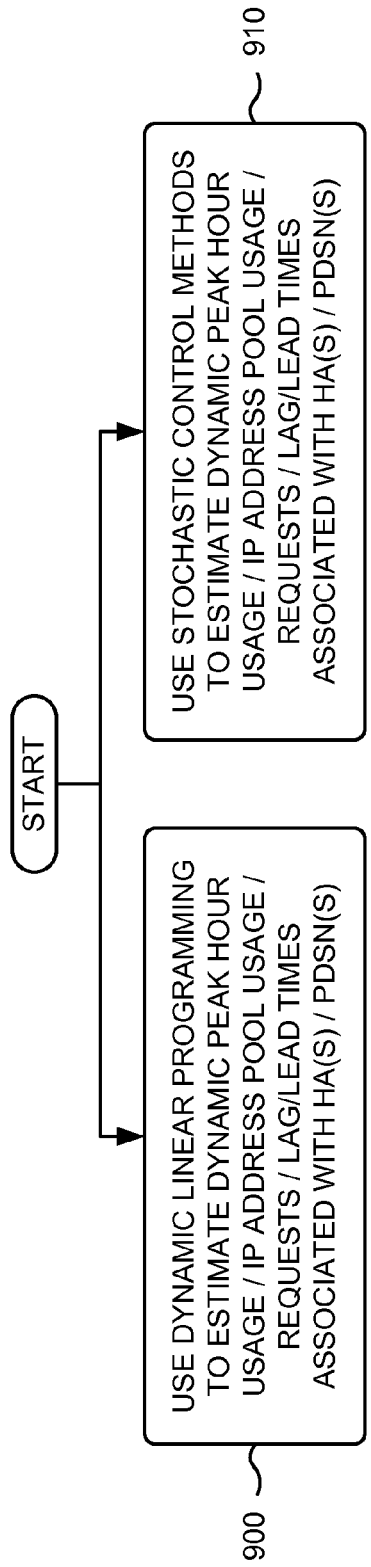

INTERNET PROTOCOL (IP) ADDRESS POOL MANAGEMENT AND ALLOCATION

BACKGROUND

The growth of data services over wireless devices (e.g., mobile communication devices, such as cell phones, personal digital assistants (PDAs), etc.) is causing the exhaustion of public IP address pools assigned to wireless service providers (e.g., wireless carriers). Currently, wireless carriers provide globally unique public IP addresses to all wireless devices. However, with the increased difficulty in obtaining globally unique IP addresses, wireless carriers will be forced to assign private IP addresses to wireless devices.

In order to alleviate the exhaustion of the public IP address pools, wireless carriers are introducing IP network address translation (NAT)-based solutions. NAT is the process of modifying network address information in IP packet headers as IP packets traverse a network device (e.g., a router) for the purpose of remapping a given address space into another address space. NAT is used in conjunction with network masquerading (or IP masquerading), which hides an entire address space (e.g., that typically includes private network addresses) behind a single IP address (e.g., in another (e.g., a public) address space). NAT is implemented in network devices that use stateful translation tables that map private addresses into a single public address and then rewrite outgoing IP packets on exit so that they appear to originate from the network devices. In response to the outgoing IP packets, packets are mapped back to an originating IP address using mapping rules stored in the translation tables.

The NAT-based solutions assume that each home agent (HA) or packet data serving node (PDSN) of a wireless network uses a size of an IP address pool based on relative network peak hour usage by the HA or PDSN. In other words, allocation of the IP address pools for each HA or PDSN is manually and statically performed regardless of whether the allocated IP address pools have been or have not been fully utilized. None of the proposed NAT-based solutions address or resolve this non-efficient method of manually allocating IP address pools.

BRIEF DESCRIPTION OF THE DRAWINGS

FIG. 1 depicts a diagram of an exemplary network in which systems and/or methods described herein may be implemented;

FIG. 2 illustrates a diagram of exemplary components of a dynamic IP pool allocator and an authorization, authentication, accounting (AAA) device of the network depicted in FIG. 1;

FIG. 3 depicts a diagram of exemplary interactions among components of an exemplary portion of the network illustrated in FIG. 1;

FIG. 4 illustrates a diagram of exemplary functional components of the dynamic IP pool allocator depicted in FIG. 1;

FIG. 6 illustrates a diagram of an exemplary call flow among an exemplary portion of the network depicted in FIG. 1 and according to implementations described herein; and FIGS. 7-10 depict flow charts of an exemplary process for managing and allocating IP address pools according to implementation described herein.

DETAILED DESCRIPTION OF PREFERRED EMBODIMENTS

Figure 5A:
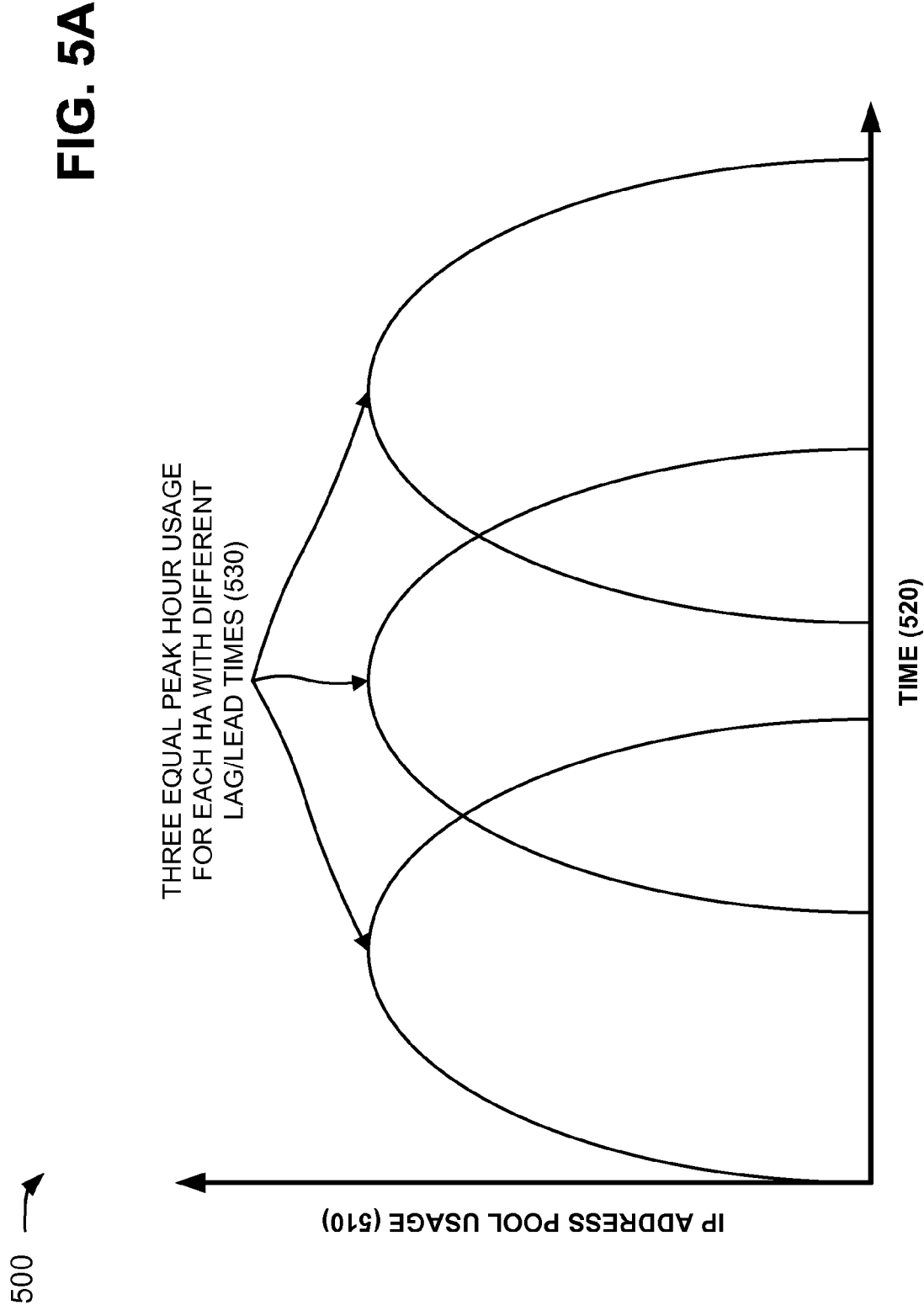
FIGS. 5A and 5B depict graphs of exemplary IP address pool peak usage and lag/lead times associated with the network illustrated in FIG. 1.

The following detailed description refers to the accompanying drawings. The same reference numbers in different drawings may identify the same or similar elements. Also, the following detailed description does not limit the invention.

Implementations described herein may provide systems and/or methods that may dynamically manage and allocate IP address pools between geographically diverse HAs, PDSNs, and/or AAA devices (e.g., in a wireless network) by continuously monitoring and estimating IP address pool peak hour usage by each HA, PDSN, and/or AAA device. The systems and/or methods may de-allocate IP address pools from one network device (e.g., one HA or PDSN) and may allocate the de-allocated IP address pools to another network device (e.g., another HA or PDSN). The systems and/or methods may allocate and/or de-allocate IP address pools based on dynamically estimating the peak hour usage of the IP address pools by the HAs and/or PDSNs, the lag or lead times between the HAs and/or PDSNs, and/or time zone differences (e.g., based on the geographic diversity) between the HAs and/or PDSNs.

In one exemplary implementation, the systems and/or methods may receive IP traffic flow data from one or more HAs and/or PDSNs associated with a wireless network, and may group the HAs/PDSNs into sets based on the IP traffic flow data. The systems and/or methods may estimate, based on the sets, dynamic peak hour usage, IP address pool usage, requests, lag/lead times, etc. associated with the HAs/PDSNs, may group the HAs/PDSNs into clusters based on the estimated information, and may rank the clusters. The systems and/or methods may create an IP allocation list based on the ranked clusters, may assign one or more IP address pools to the HAs/PDSNs based on the IP allocation list, and may provide the assigned IP address pool(s) to an AAA device for allocation to the HAs/PDSNs.

As used herein, the terms "user" and "caller" are intended to be broadly interpreted to include user equipment (UE) or a user of user equipment.

FIG. 1 is a diagram of an exemplary network 100 in which systems and/or methods described herein may be implemented. As illustrated, network 100 may include a user equipment (UE) 110, a dynamic IP pool allocator 120, AAA devices 130, HAs 140, and PDSNs 150 interconnected by a network 170. One AAA device 130, one HA 140, and one PDSN 150 may form one or more components of a first network 160-1, and another AAA device 130, another HA 140, and another PDSN 150 may form one or more components of a second network 160-2. Components of network 100 may interconnect via wired and/or wireless connections. A single UE 110, a single dynamic IP allocator 120, two AAA devices 130, two HAs 140, two PDSNs 150, two networks 160, and a single network 170 have been illustrated in FIG. 1 for simplicity. In practice, there may be more or fewer UEs 110, dynamic IP allocators 120, AAA devices 130, HAs 140, PDSNs 150, networks 160, and/or networks 170. Also, in some instances, one or more of the components of network 100 may perform one or more functions described as being performed by another one or more of the components of network 100.

UE 110 may include a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), or other types of mobile communication devices. In an exemplary implementation, UE 110 may include a mobile communication device that is capable of being assigned an IP address by one of HAs 140.

Dynamic IP pool allocator 120 may include one or more server devices, or other types of computation or communication devices, that gather, process, search, and/or provide information in a manner described herein. In an exemplary implementation, dynamic IP pool allocator 120 may receive IP traffic flow data from HAs 140 and/or PDSNs 150, and may group HAs 140/PDSNs 150 into sets based on the IP traffic flow data. Dynamic IP pool allocator 120 may estimate, based on the sets, dynamic peak hour usage, IP address pool usage, requests, lag/lead times, etc. associated with HAs 140/PDSNs 150, may group HAs 140/PDSNs 150 into clusters based on the estimated information, and may rank the clusters. Dynamic IP pool allocator 120 may create an IP allocation list based on the ranked clusters, may assign one or more IP address pools to HAs 140/PDSNs 150 based on the IP allocation list, and may provide the assigned IP address pool (s) to AAA devices 130 for allocation to HAs 140/PDSNs 150. Further details of dynamic IP pool allocator 120 are provided below in connection with, for example, FIGS. 2-4.

AAA device 130 may include one or more server devices, or other types of computation or communication devices, that gather, process, search, and/or provide information in a manner described herein. In an exemplary implementation, AAA device 130 may provide IP functionality to support authentication, authorization, and accounting functions. With regard to the authentication function, AAA device 130 may verify a device's (e.g., UE's 110) specific digital identity provided via an identifier (e.g., a password, a digital certificate, a phone number, etc.) associated with the device. With regard to the authorization function, AAA device 130 may grant or refuse privileges to a device (e.g., UE 110) for accessing specific services (e.g., IP address filtering, address assignment, route assignment, quality of service (QoS), etc.). With regard to the accounting function, AAA device 130 may track consumption of network resources by users (e.g., by UE 110) and may use this information for management, planning, billing, etc.

HA 140 may include a data transfer device (i.e., a network device), such as a gateway, a router, a switch, a firewall, a network interface card (NIC), a hub, a bridge, a proxy server, an optical add-drop multiplexer (OADM), or some other type of device that processes and/or transfers data. In an exemplary implementation, HA 140 may include a network device (e.g., on a mobile node's (e.g., UE's 110) home network) that tunnels data for delivery to UE 110 when UE 110 is away from its home network (e.g., network 160-1) so that UE's 110 IP address does not have to be changed each time UE 110 connects from a different location. HA 140 may maintain current location (e.g., IP address) information for UE 110.

PDSN 150 may include a device (e.g., of a code division multiple access (CDMA) mobile network) that acts as a connection point between a radio access network (e.g., networks 160-1 and 160-2) and an IP network. For example, PDSN 150 may include a network device, such as a gateway, a router, a switch, a firewall, a NIC, a hub, a bridge, a proxy server, an OADM, or some other type of device that processes and/or transfers data. PDSN 150 may manage point-to-point protocol (PPP) sessions between a mobile provider's IP network and a mobile device (e.g., UE 110) connected to one of networks 160-1 or 160-2. PDSN 150 may act as an access gateway, may provide foreign agent support, and may provide packet transport for virtual private networking. In one example, PDSN 150 may include a 1xRTT (radio transmission technology) PDSN, an evolution-data optimized (EVDO) PDSN, etc.

Each of HA 140 or PDSN 150 may be referred to herein as a "network gateway" or a "network device." The term "network device," as used herein, intended to be broadly interpreted to include a device that uses, assigns, and/or manages IP address pools, such as an AAA device, a HA, a PDSN, etc.

Each of networks 160-1 and 160-2 may include a wireless network, a radio access network, a cellular network, a Wi-Fi network, a mobile IP-based network, etc. In one exemplary implementation, each of networks 160-1 and 160-2 may include one or more devices for transmitting voice and/or data to/from UE 110 and dynamic IP pool allocator 120, via network 170.

Network 170 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks.

Although FIG. 1 shows exemplary components (e.g., devices) of network 100, in other implementations, network 100 may contain fewer, different, differently arranged, or additional components than depicted in FIG. 1. For example, network 100 may include one or more other devices for transmitting voice and/or data to/from UE 110 and dynamic IP pool allocator 120, via network 170, not depicted in FIG. 1.

FIG. 2 is an exemplary diagram of a device 200 that may correspond to one or more of dynamic IP pool allocator 120 and AAA device 130. As illustrated, device 200 may include a bus 210, a processing unit 220, a main memory 230, a read-only memory (ROM) 240, a storage device 250, an input device 260, an output device 270, and/or a communication interface 280. Bus 210 may include a path that permits communication among the components of device 200.

Processing unit 220 may include one or more processors, microprocessors, or other types of processing units that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network.

As described herein, device 200 may perform certain operations in response to processing unit 220 executing software instructions contained in a computer-readable medium, such as main memory 230. A computer-readable medium may be defined as a physical or logical memory device. A logical memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, differently arranged, or additional components than depicted in FIG. 2. In still other implementations, one or more components of device 200 may perform one or more other tasks described as being performed by one or more other components of device 200.

FIG. 3 depicts a diagram of exemplary interactions among components of an exemplary portion 300 of network 100. As illustrated, exemplary network portion 300 may include dynamic IP pool allocator 120, AAA devices 130, and networks 160-1 and 160-2. Dynamic IP pool allocator 120, AAA devices 130, and networks 160-1 and 160-2 may include the features described above in connection with, for example, FIGS. 1 and 2.

As further shown in FIG. 3, dynamic IP pool allocator 120 may receive IP traffic flow data 310 from networks 160-1 and 160-2 (e.g., from devices associated with networks 160-1 and 160-2, such as HAs 140 and/or PDSNs 150). In one exemplary implementation, dynamic IP pool allocator 120 may retrieve IP traffic flow data 310 from networks 160-1 and 160-2 on a scheduled basis. In another exemplary implementation, dynamic IP pool allocator 120 may retrieve IP traffic flow data 310 from networks 160-1 and 160-2 on an unscheduled basis (e.g., constantly or when IP traffic flow data 310 is available). IP traffic flow data 310 may include information associated with HAs 140 and/or PDSNs 150, such as locations of HAs 140 and/or PDSNs 150, time zones associated with HAs 140 and/or PDSNs 150, usage of IP address pools by HAs 140 and/or PDSNs 150, availability of HAs 140 and/or PDSNs 150, etc.

Dynamic IP pool allocator 120 may determine an IP pool list 320 based on IP traffic flow data 310 and may provide IP pool list 320 to AAA devices 130. IP pool list 320 may include a list of IP address pools (e.g., names of IP address pools) and HAs 140 and/or PDSNs 150 assigned to the IP address pools. In one example, each of HAs 140 and/or PDSNs 150 may be assigned at least one IP address pool and may be assigned more than one IP address pool. In one exemplary implementation, dynamic IP pool allocator 120 may group IP traffic flow data 310 into sets based on service types associated with HAs 140/PDSNs 150, and may estimate, based on the sets, dynamic peak hour usage, IP address pool usage, requests, lag/lead times, etc. associated with HAs 140/PDSNs 150. Dynamic IP pool allocator 120 may group HAs 140/PDSNs 150 into clusters based on the estimated information, and may rank the clusters. Dynamic IP pool allocator 120 may create an IP allocation list based on the ranked clusters, and may assign one or more IP address pools to HAs 140/PDSNs 150 (e.g., may create IP pool list 320) based on the IP allocation list.

As further shown in FIG. 3, AAA devices 130 may receive IP pool list 320 from dynamic IP pool allocator 120, and may allocate IP address pools (e.g., to one or more HAs 140 and/or PDSNs 150), as indicated by reference number 330. In one exemplary implementation, AAA devices 130 may allocate IP address pools based on IP pool list 320. For example, AAA devices 130 may allocate IP address pools to HAs 140 and/or PDSNs 150 assigned to the IP address pools (e.g., as indicated in IP pool list 320). In another exemplary implementation, another network device may receive IP pool list 320 from dynamic IP pool allocator 120, and may allocate IP address pools (e.g., to one or more HAs 140 and/or PDSNs 150).

Although FIG. 3 shows exemplary components of network portion 300, in other implementations, network portion 300 may contain fewer, different, differently arranged, or additional components than depicted in FIG. 3. In still other implementations, one or more components of network portion 300 may perform one or more other tasks described as being performed by one or more other components of network portion 300.

FIG. 4 illustrates a diagram of exemplary functional components of dynamic IP pool allocator 120. In one implementation, the functions described in connection with FIG. 4 may be performed by one or more of the components of device 200, as depicted in FIG. 2. As shown in FIG. 4, dynamic IP pool allocator 120 may include a dynamic IP flow data organizer 400, a stochastic adaptive control data optimizer 405, a HA/PDSN IP pool ranker/categorizer 410, a HA/PDSN dynamic allocation manager 415, and a dynamic IP pool events logger 420.

Dynamic IP flow data organizer 400 may include hardware or a combination of hardware and software that may receive IP traffic flow data 310 (e.g., on a scheduled or unscheduled basis) from one or more HAs 140 and/or PDSNs 150, and may group HAs 140/PDSNs 150 into sets 425 based on IP traffic flow data 310. In one exemplary implementation, dynamic IP flow data organizer 400 may group HAs 140/PDSNs 150 into sets 425 based on locations of HAs 140/PDSNs 150, time zones associated with HAs 140/PDSNs 150, usage of IP address pools by HAs 140/PDSNs 150, availability of HAs 140/PDSNs 150, etc. As further shown in FIG. 4, dynamic IP flow data organizer 400 may provide sets 425 to stochastic adaptive control data optimizer 405 (e.g., for further processing), and may provide IP traffic flow data 310 and sets 425 to dynamic IP pool events logger 420 (e.g., for storage).

Stochastic adaptive control data optimizer 405 may include hardware or a combination of hardware and software that may receive sets 425, and may apply dynamic linear programming methods and/or stochastic control methods (e.g., to sets 425) to estimate (a) peak hour usage 430 of IP address pools by HAs 140/PDSNs 150, (b) lag or lead times 435 between HAs 140/PDSNs 150, and (c) frequency usage of IP address pools and/or requests 440 by each HA 140 and/or PDSN 150. The dynamic linear programming methods applied by stochastic adaptive control data optimizer 405 may include methods for solving complex problems (e.g., problems that exhibit overlapping subproblems and optimal substructure) by breaking the complex problems down into simpler steps. Overlapping subproblems means that a space of subproblems is small and may be solved over and over. Optimal substructure means that a solution to an optimization problem can be obtained from a combination of optimal solutions to its subproblems. The stochastic control methods applied by stochastic adaptive control data optimizer 405 may include optimization algorithms that incorporate probabilistic (e.g., random) elements in problem data (e.g., an objective function, constraints, etc.), in the algorithm itself (e.g., through random parameter values, random choices, etc.), or in both the problem data and the algorithm. As further shown in FIG. 4, stochastic adaptive control data optimizer 405 may provide peak hour usage 430, lag/lead times 435, and/or frequency usage/requests 440 estimates to HA/PDSN IP pool ranker/categorizer 410 (e.g., for further processing) and to dynamic IP pool events logger 420 (e.g., for storage).

HA/PDSN IP pool ranker/categorizer 410 may include hardware or a combination of hardware and software that may receive peak hour usage 430, lag/lead times 435, and/or frequency usage/requests 440 estimates from stochastic adaptive control data optimizer 405. Based on the received estimates, HA/PDSN IP pool ranker/categorizer 410 may group HAs 140/PDSNs 150 into clusters ranging from a HA 140/PDSN 150 with a greatest IP address pool usage to a HA 140/PDSN 150 with a smallest IP address pool usage. HA/PDSN IP pool ranker/categorizer 410 may rank the clusters (or each HA 140 and/or PDSN 150) based on IP address pool usage (e.g., from the greatest IP address pool usage to the smallest IP address pool usage), to form ranked HA/PDSN clusters 445. HA/PDSN IP pool ranker/categorizer 410 may assign at least one IP address pool to each HA 140 and/or PDSN 150 (e.g., from which each HA and/or PDSN 150 may draw IP addresses), and may create an IP allocation list 450 that includes a list of HAs 140 and/or PDSNs 150 and their assigned IP address pools. In one exemplary implementation, each HA 140 or PDSN 150 may be assigned more than one IP address pool (e.g., depending on its rank in ranked HA/PDSN clusters 445 and/or its position in IP allocation list 450). As further shown in FIG. 4, HA/PDSN IP pool ranker/categorizer 410 may provide ranked HA/PDSN clusters 445 and/or IP allocation list 450 to HA/PDSN dynamic allocation manager 415 (e.g., for further processing) and to dynamic IP pool events logger 420 (e.g., for storage).

HA/PDSN dynamic allocation manager 415 may include hardware or a combination of hardware and software that may receive ranked HA/PDSN clusters 445 and IP allocation list 450 from HA/PDSN IP pool ranker/categorizer 410, and may generate IP pool list 320 based on ranked HA/PDSN clusters 445 and IP allocation list 450. HA/PDSN dynamic allocation manager 415 may provide IP pool list 320 to AAA devices 130, and AAA devices 130 may allocate IP address pools to one or more HAs 140 and/or PDSNs 150 based on IP pool list 320. HA/PDSN dynamic allocation manager 415 may provide IP pool list 320 to dynamic IP pool events logger 420 (e.g., for storage).

Dynamic IP pool events logger 420 may include one or more databases (e.g., provided in storage device 250 (FIG. 2)) that store information associated with dynamic IP pool allocator 120. For example, dynamic IP pool events logger 420 may store IP traffic flow data 310, IP pool list 320, sets 425, peak hour usage 430, lag/lead times 435, frequency usage/requests 440, ranked HA/PDSN clusters 445, and/or IP allocation list 450.

Although FIG. 4 shows exemplary functional components of dynamic IP pool allocator 120, in other implementations, dynamic IP pool allocator 120 may contain fewer, different, differently arranged, or additional functional components than depicted in FIG. 4. In still other implementations, one or more functional components of dynamic IP pool allocator 120 may perform one or more other tasks described as being performed by one or more other functional components of dynamic IP pool allocator 120.

Figure 5B:
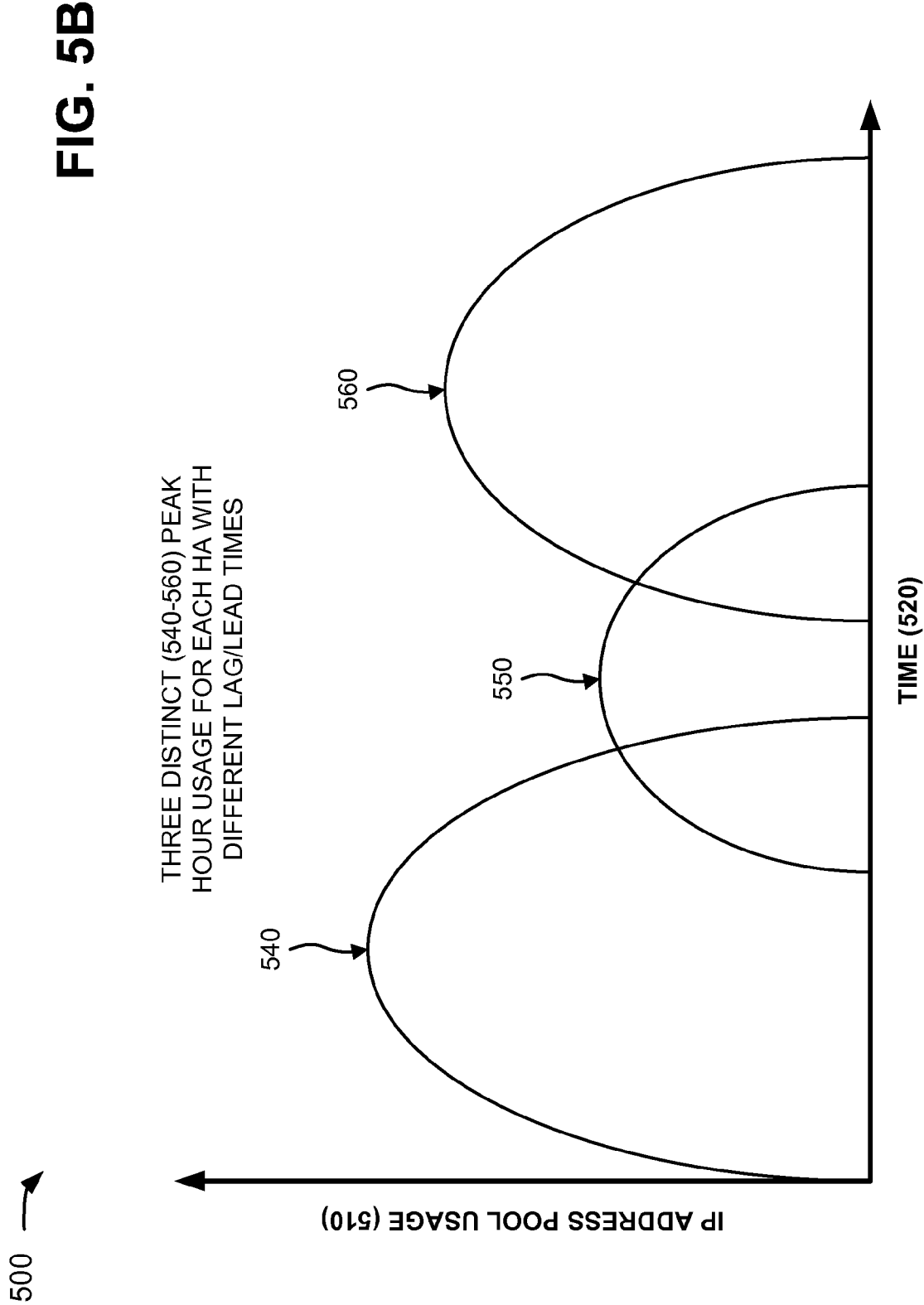

FIGS. 5A and 5B depict graphs 500 of exemplary IP address pool peak usage and lag/lead times associated with network 100 (e.g., with HAs 140 and/or PDSNs 150). As shown in FIGS. 5A and 5B, graphs 500 may include an IP address pool usage axis 510 and a time axis 520. IP address pool usage axis 510 may provide an indication of the usage of IP address pools by HAs 140 and/or PDSNs 150. Time axis 520 may provide an indication of time, such as time of day, a particular hour, etc. FIGS. 5A and 5B may depict peak hour IP address pool usage for three different HAs 140 (or PDSNs 150).

As shown by reference number 530 in FIG. 5A, the peak hour IP address pool usages associated with the three HAs 140 may be the same, and the lag/lead times associated with the three HAs 140 may be different. As shown in FIG. 5B, the peak hour IP address pool usages associated with the three HAs 140 may be different, and the lag/lead times associated with the three HAs 140 may be different. For example, the first HA 140 may include a first peak hour IP address pool usage 540, the second HA 140 may include a second peak hour IP address pool usage 550, and the third HA 140 may include a third peak hour IP address pool usage 560 (e.g., that is greater than second peak hour IP address pool usage 550 but less than first peak hour IP address pool usage 540). The information illustrated in FIGS. 5A and 5B may be utilized by dynamic IP pool allocator 120 to manage and allocate IP address pools between geographically diverse AAA devices 130, HAs 140, and/or PDSNs 150.

Although FIGS. 5A and 5B show exemplary information that may be utilized by dynamic IP pool allocator 120, in other implementations, dynamic IP pool allocator 120 may utilize different or additional information than depicted in FIGS. 5A and 5B.

FIG. 6 illustrates a diagram of an exemplary call flow among an exemplary portion 600 of network 100. As shown, exemplary network portion 600 may include UE 110, dynamic IP pool allocator 120, AAA device 130, HA 140, and PDSN 150. UE 110, dynamic IP pool allocator 120, AAA device 130, HA 140, and PDSN 150 may include the features described above in connection with, for example, FIGS. 1-4.

As further shown in FIG. 6, UE 110 may request user authentication from PDSN 150 (line 610). For example, UE 110 may request authorization to access a service (e.g., a voice over IP (VoIP) service) provided by a network (e.g., network 160-1). PDSN 150 may provide the request for user authentication to AAA device 130 (line 620). AAA device 130 may receive the request for user authentication, and may determine if UE 110 is authenticated (e.g., based on an identifier (e.g., a password, a digital certificate, a phone number, etc.) associated with UE 110). If UE 110 is determined to be authenticated by AAA device 130, AAA device 130 may provided an indication that the request for user authentication "passed" to PDSN 150 (line 630).

HA 140 may request an IP address pool name from AAA device 130, and AAA device 130 may receive the request for an IP address pool name (line 640). AAA device 130 may request an updated IP pool list from dynamic IP pool allocator 120, and dynamic IP pool allocator 120 may receive the request for an updated IP pool list (line 650). Based on the request for an updated IP pool list, dynamic IP pool allocator 120 may provide the updated IP pool list (e.g., IP pool list 320 (FIG. 3)) to AAA device 130 (line 660). AAA device 130 may use the updated IP pool list to determine an IP address pool name, and may provide the determined IP address pool name to HA 140 (line 670). HA 140 may establish a tunnel (e.g., for tunneling data for delivery to UE 110) to PDSN 150 (line 680), and may assign an IP address (e.g., based on the determined IP address pool name) to UE 110 via the tunnel (line 690).

Although FIG. 6 shows exemplary components of network portion 600, in other implementations, network portion 600 may contain fewer, different, differently arranged, or additional components than depicted in FIG. 6. In still other implementations, one or more components of network portion 600 may perform one or more other tasks described as being performed by one or more other components of network portion 600.

FIGS. 7-10 depict flow charts of an exemplary process 700 for managing and allocating IP address pools according to implementation described herein. In one implementation, process 700 may be performed by dynamic IP pool allocator 120. In another implementation, some or all of process 700 may be performed by another device or group of devices, including or excluding dynamic IP pool allocator 120.

As shown in FIG. 7, process 700 may include receiving IP traffic flow data from one or more HAs and/or PDSNs of a wireless network (block 710), and grouping the one or more HAs/PDSNs into sets based on the IP traffic flow data (block 720). For example, in implementations described above in connection with FIG. 4, dynamic IP flow data organizer 400 of dynamic IP pool allocator 120 may receive IP traffic flow data 310 (e.g., on a scheduled or unscheduled basis) from one or more HAs 140 and/or PDSNs 150, and may group HAs 140/PDSNs 150 into sets 425 based on IP traffic flow data 310.

As further shown in FIG. 7, dynamic peak hour usage, IP address pool usage, requests, and/or lag/lead times associated with the one or more HAs/PDSNs may be estimated based on the sets (block 730), and the one or more HAs/PDSNs may be grouped into clusters based on the estimated information and the clusters may be ranked (block 740). For example, in implementations described above in connection with FIG. 4, stochastic adaptive control data optimizer 405 of dynamic IP pool allocator 120 may receive sets 425 and may estimate (e.g., based on sets 425) peak hour usage 430 of IP address pools by HAs 140/PDSNs 150, lag or lead times 435 between HAs 140/PDSNs 150, and frequency usage of IP address pools and/or requests 440 by each HA 140 and/or PDSN 150. HA/PDSN IP pool ranker/categorizer 410 of dynamic IP pool allocator 120 may receive peak hour usage 430, lag/lead times 435, and/or frequency usage/requests 440 estimates from stochastic adaptive control data optimizer 405. Based on the received estimates, HA/PDSN IP pool ranker/categorizer 410 may group HAs 140/PDSNs 150 into clusters ranging from a HA 140/PDSN 150 with a greatest IP address pool usage to a HA 140/PDSN 150 with a smallest IP address pool usage. HA/PDSN IP pool ranker/categorizer 410 may rank the clusters (or each HA 140 and/or PDSN 150) based on IP address pool usage (e.g., from the greatest IP address pool usage to the smallest IP address pool usage), to form ranked HA/PDSN clusters 445.

Returning to FIG. 7, an IP allocation list may be created based on the ranked clusters (block 750), one or more IP address pools may be assigned to the one or more HAs/PDSNs based on the IP allocation list (block 760), the assigned IP address pool(s) may be provided to one or more AAA devices for allocation to the one or more HAs/PDSNs (block 770), and information may be stored (block 780). For example, in implementations described above in connection with FIG. 4, HA/PDSN dynamic allocation manager 415 of dynamic IP pool allocator 120 may receive ranked HA/PDSN clusters 445 and IP allocation list 450 from HA/PDSN IP pool ranker/categorizer 410, and may generate IP pool list 320 (e.g., a list of IP address pool names and HAs 140 and/or PDSNs 150 assigned to the IP address pool names) based on ranked HA/PDSN clusters 445 and IP allocation list 450. HA/PDSN dynamic allocation manager 415 may provide IP pool list 320 to AAA devices 130, and AAA devices 130 may allocate IP address pools to one or more HAs 140 and/or PDSNs 150 based on IP pool list 320. Dynamic IP pool events logger 420 of dynamic IP pool allocator 120 may include one or more databases that store information associated with dynamic IP pool allocator 120.

Process block 720 may include the process blocks depicted in FIG. 8. As shown in FIG. 8, process block 720 may include grouping the one or more HAs/PDSNs into sets based on locations of the one or more HAs/PDSNs (block 800), time information associated with the one or more HAs/PDSNs (block 810), IP address pool usage associated with the one or more HAs/PDSNs (block 820), and/or availability of the one or more HAs/PDSNs (block 830). For example, in implementations described above in connection with FIG. 4, dynamic IP flow data organizer 400 of dynamic IP pool allocator 120 may group HAs 140/PDSNs 150 into sets 425 based on locations of HAs 140/PDSNs 150, time zones associated with HAs 140/PDSNs 150, usage of IP address pools by HAs 140/PDSNs 150, availability of HAs 140/PDSNs 150, etc.

Process block 730 may include the process blocks depicted in FIG. 9. As shown in FIG. 9, process block 730 may include using dynamic linear programming to estimate the dynamic peak hour usage, IP address pool usage, requests, and/or lag/lead times associated with the one or more HAs/PDSNs (block 900) and/or using stochastic control methods to estimate the dynamic peak hour usage, IP address pool usage, requests, and/or lag/lead times associated with the one or more HAs/PDSNs (block 910). For example, in implementations described above in connection with FIG. 4, stochastic adaptive control data optimizer 405 of dynamic IP pool allocator 120 may receive sets 425, and may apply dynamic linear programming methods and/or stochastic control methods (e.g., to sets 425) to estimate peak hour usage 430 of IP address pools by HAs 140/PDSNs 150, lag or lead times 435 between HAs 140/PDSNs 150, and frequency usage of IP address pools and/or requests 440 by each HA 140 and/or PDSN 150. The dynamic linear programming methods applied by stochastic adaptive control data optimizer 405 may include methods for solving complex problems (e.g., problems that exhibit overlapping subproblems and optimal substructure) by breaking the complex problems down into simpler steps. The stochastic control methods applied by stochastic adaptive control data optimizer 405 may include optimization algorithms that incorporate probabilistic (e.g., random) elements in problem data (e.g., an objective function, constraints, etc.), in the algorithm itself (e.g., through random parameter values, random choices, etc.), or in both the problem data and the algorithm.

Figure 10:
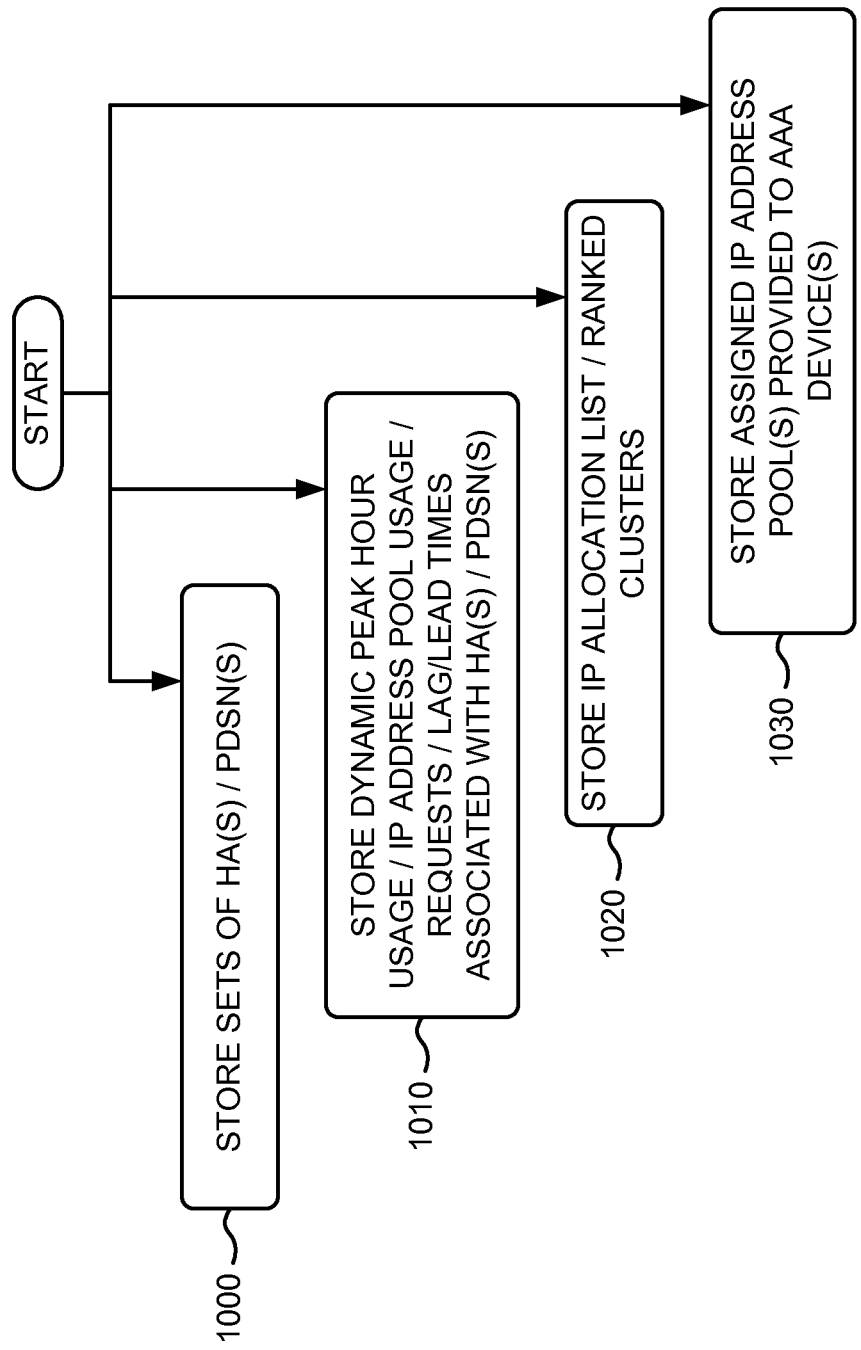

Process block 780 may include the process blocks depicted in FIG. 10. As shown in FIG. 10, process block 780 may include storing the sets of HAs/PDSNs (block 1000), storing the dynamic peak hour usage, IP address pool usage, requests, and/or lag/lead times associated with the one or more HAs/PDSNs (block 1010), storing the IP allocation list and the ranked clusters (block 1020), and/or storing the assigned IP address pool(s) provided to the one or more AAA devices (block 1030). For example, in implementations described above in connection with FIG. 4, dynamic IP pool events logger 420 of dynamic IP pool allocator 120 may store IP traffic flow data 310, IP pool list 320, sets 425, peak hour usage 430, lag/lead times 435, frequency usage/requests 440, ranked HA/PDSN clusters 445, and/or IP allocation list 450.

Implementations described herein may provide systems and/or methods that may dynamically manage and allocate IP address pools between geographically diverse HAs, PDSNs, and/or AAA devices (e.g., in a wireless network) by continuously monitoring and estimating IP address pool peak hour usage by each HA, PDSN, and/or AAA device. The systems and/or methods may de-allocate IP address pools from one network device (e.g., one HA or PDSN) and may allocate the de-allocated IP address pools to another network device (e.g., another HA or PDSN). The systems and/or methods may allocate and/or de-allocate IP address pools based on dynamically estimating the peak hour usage of the IP address pools by the HAs and/or PDSNs, the lag or lead times between the HAs and/or PDSNs, and/or time zone differences (e.g., based on the geographic diversity) between the HAs and/or PDSNs.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-10, the order of the blocks may be modified in other implementations. Further, non-dependent blocks may be performed in parallel.

It will be apparent that aspects described herein may be implemented in many different forms of software, firmware, and hardware in the implementations illustrated in the figures. The actual software code or specialized control hardware used to implement embodiments described herein is not limiting of the invention. Thus, the operation and behavior of the aspects were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
    receiving, by the computing device, Internet protocol (IP) traffic flow data from a plurality of network devices of a wireless network;
    determining, by the computing device and based on the IP traffic flow data, information associated with the plurality of network devices, the information including at least one of:
        respective dynamic peak hour usages associated with the plurality of network devices,
        respective IP address pool usages associated with the plurality of network devices,
        respective quantities of requests associated with the plurality of network devices, or
        respective lag or lead times associated with the plurality of network devices;
    grouping, by the computing device and based on the at least one of the respective dynamic peak hour usages, the respective IP address pool usages, the respective quantities of requests, or the respective lag or lead times, the plurality of network devices into clusters;
    ranking, by the computing device and based on the information, the clusters;
    assigning, by the computing device and based on the ranked clusters, respective IP address pools to the plurality of network devices,
        each network device, of the plurality of network devices, distributing a respective plurality of IP addresses, included in a corresponding one of the respective IP address pools, to a corresponding plurality of client devices, and
        the plurality of network devices being different from the corresponding plurality of client devices; and
    providing, by the computing device, data regarding the respective IP address pools to one or more server devices of the wireless network,
        the one or more server devices forwarding the data regarding the respective IP address pools to the plurality of network devices.

2. The computing device-implemented method of claim 1, where the plurality of network devices include at least one of:
    a plurality of home agents (HAs), or
    a plurality of packet data serving nodes (PDSNs).

3. The computing device-implemented method of claim 1, where the one or more server devices include:
    an authorization, authentication, accounting (AAA) device that allocates one or more of the respective IP address pools to one or more of the plurality of network devices.

4. The computing device-implemented method of claim 1, where determining the information associated with the plurality of network devices is further based on one or more of:
    respective time information associated with the plurality of network devices,
    respective locations associated with the plurality of network devices, or
    respective availabilities of the plurality of network devices.

5. The computing device-implemented method of claim 1, where determining the information associated with the plurality of network devices includes at least one of:
    using dynamic linear programming to determine, based on the IP traffic flow data, the at least one of the respective dynamic peak hour usages, the respective IP address pool usages, the respective quantities of requests, or the respective lag or lead times, or
    using stochastic control methods to determine, based on the IP traffic flow data, the at least one of the respective dynamic peak hour usages, the respective IP address pool usages, the respective quantities of requests, or the respective lag or lead times.

6. The computing device-implemented method of claim 1, further comprising:
    determining, after assigning the respective IP address pools to the plurality of network devices, updated information associated with one or more of:
        respective locations of the plurality of network devices;
        the at least one of the respective dynamic peak hour usages, the respective IP address pool usages, the respective quantities of requests, or the respective lag or lead times;
        the ranking of the clusters; or
        the assigned IP address pools provided to the one or more devices; and
    updating the assigning of the respective IP address pools based on the updated information.

7. The computing device-implemented method of claim 1, where assigning the respective IP address pools further includes:
    creating an IP allocation list based on the ranked clusters, and
    assigning the respective IP address pools to the plurality of network devices based on the IP allocation list.

8. The computing device-implemented method of claim 1, further comprising:

dynamically managing the respective IP address pools between geographically diverse network devices, of the plurality of network devices.

9. The computing device-implemented method of claim 1, where receiving the IP traffic flow data comprises:
retrieving the IP traffic flow data from the plurality of network devices on a scheduled basis.

10. A device comprising:
a memory; and
a processor to:
store, in the memory, Internet protocol (IP) traffic flow data associated with a plurality of network devices of a wireless network,
determine, based on the IP traffic flow data information associated with the plurality of network devices,
the information including at least one of:
respective dynamic peak hour usages associated with the plurality of network devices,
respective IP address pool usages associated with the plurality of network devices,
respective quantities of requests associated with the plurality of network devices, or
respective lag or lead times associated with the plurality of network devices,
assign, based on the at least one of the respective dynamic peak hour usages, the respective IP address pool usages, the respective quantities of requests, or the respective lag or lead times, the plurality of network devices to clusters,
rank, based on the information, the clusters,
assign respective IP address pools to the plurality of network devices,
respective quantities of IP addresses, included in the respective IP address pools assigned to the plurality of network devices, being based the respective ranked clusters to which the plurality of network device are assigned,
the plurality of network devices distributing corresponding IP addresses, included in the respective IP address pools, to corresponding pluralities of client devices, and
the plurality of network devices being different from the pluralities of client devices, and
provide data regarding the respective IP address pools to one or more server devices that manage the one or more IP address pools,
the one or more server devices forwarding the data regarding the respective IP address pools to the plurality of network devices.

11. The device of claim 10, where the processor, when assigning the respective IP address pools, is further to:
create an IP allocation list based on the ranked clusters, and
assign the respective IP address pools to the plurality of network devices based on the IP allocation list.

12. The device of claim 10, where the processor, when receiving the IP traffic flow data, is further to:
retrieve the IP traffic flow data from the plurality of network devices on a scheduled basis.

13. The device of claim 10, where the plurality of network devices include at least one of:
a plurality of home agents (HAs), or
a plurality of packet data serving nodes (PDSNs).

14. The device of claim 10, where the one or more devices are further to allocate the respective IP address pools to the plurality of network devices by forwarding the data regarding the respective IP address pools to the plurality of network devices.

15. The device of claim 10, where the processor, when assigning the plurality of network devices to clusters, is further to:
assign the plurality of network devices to the clusters further based on one or more of:
respective locations of the plurality of network devices,
respective time information associated with the plurality of network devices, or
respective availabilities of the plurality of network devices.

16. The device of claim 10, where the processor, when determining the information, is further to at least one of:
use dynamic linear programming to determine, based on the IP traffic flow data, the at least one of the respective dynamic peak hour usages, the respective IP address pool usages, the respective quantities of requests, or the respective lag or lead times, or
use stochastic control methods to determine, based on the IP traffic flow data, the at least one of the respective dynamic peak hour usages, the respective IP address pool usages, the respective quantities of requests, or the respective lag or lead times.

17. The device of claim 10, where the processor is further to:
identify an update associated with one or more of:
respective locations of network devices,
the information associated with the plurality of network devices, or
information associated with the ranked clusters, and
revise, based on the identified update, the respective IP address pools.

18. The device of claim 10, where the processor is further to:
dynamically manage the respective IP address pools between geographically diverse network devices, of the plurality of network devices.

19. The device of claim 10, where the one or more devices that manage the one or more IP address pools are further to:
reallocate an IP address pool, of the respective IP address pools, from one network device of the plurality of network devices to another network device of the plurality of network devices.

20. The device of claim 10, where the processor is further to:
monitor data associated with IP address pool peak hour usages associated with the plurality of network devices, and
update, based on the monitored data, the assigning of the respective IP address pools to the plurality of network devices.

21. A non-transitory computer-readable medium to store instructions, the instructions comprising
one or more instructions which, when executed by a processor, cause the processor to receive Internet protocol (IP) traffic flow data from a plurality of network devices of a wireless network;
one or more instructions which, when executed by the processor, cause the processor to determine, based on the IP traffic flow data, information associated with the plurality of network devices, the information including at least one of:
peak hour usages associated with the plurality of network devices, IP address pool usage associated with the plurality of network devices,
requests associated with the plurality of network devices, or
lag or lead times associated with the plurality of network devices;
one or more instructions which, when executed by the processor, cause the processor to assign, based on at least one of the dynamic peak hour usage, the IP address pool usage, the requests, or the lag or lead times, the plurality of network devices to clusters;
one or more instructions which, when executed by the processor, cause the processor to rank the clusters based on the respective locations; and
one or more instructions which, when executed by the processor, cause the processor to assign respective IP address pools to the plurality of network devices based on the ranked clusters,
respective quantities of IP addresses, included in the respective IP address pools assigned to the plurality of network devices, being based the respective ranked clusters to which the plurality of network device are assigned,
the plurality of network devices distributing the respective quantities IP addresses, included in the respective IP address pools, to corresponding pluralities of client devices, and
the plurality of network devices being different from the corresponding pluralities of client devices.

22. The non-transitory computer-readable medium of claim 21, where the one or more instructions to assign the respective IP address pools further include:
one or more instructions to create an IP allocation list based on the ranked clusters, and
one or more instructions to assign the respective IP address pools to the plurality of network devices based on the IP allocation list.

23. The non-transitory computer-readable medium of claim 21, where the one or more instructions to receive the IP traffic flow data include:
one or more instructions to determine respective IP address pool peak usage by the plurality of network devices, and
where the one or more instructions to assign the plurality of network devices to the clusters further include:
one or more instructions to assign the plurality of network devices to the clusters further based on the respective IP address pool peak usage by the plurality of network devices.

24. The non-transitory computer-readable medium of claim 21, where the one or more instructions to assign the plurality of network devices to the clusters further include:
one or more instructions to assign the plurality of network devices to the clusters further based on one or more of:
respective time information associated with the plurality of network devices,
respective availabilities of the plurality of network devices.

\* \* \* \* \*